United States Patent [19]

Koncen

[11] 3,743,835
[45] July 3, 1973

[54] LASER IMAGE AND POWER LEVEL DETECTOR HAVING THERMOGRAPHIC PHOSPHOR

[75] Inventor: Raymond E. Koncen, Oxon Hill, Md.

[73] Assignee: The United States of America as represented by the Secretary of the Navy, Washington, D.C.

[22] Filed: Mar. 23, 1972

[21] Appl. No.: 237,426

[52] U.S. Cl. ............................ 250/83.3 H, 250/71 R
[51] Int. Cl. ................................................ G01t 1/16
[58] Field of Search .................. 250/83.3 H, 71.5 R, 250/83.3, 71 R

[56] References Cited
UNITED STATES PATENTS

| | | | |
|---|---|---|---|
| 2,161,644 | 6/1969 | Van Der Grinten | 250/83.3 H |
| 3,659,102 | 4/1972 | Toriyama | 250/71.5 R |
| 2,705,758 | 4/1955 | Karrelian | 250/83.3 H |
| 3,459,945 | 8/1969 | Astheimee | 250/83.3 H |
| 3,501,638 | 3/1970 | Compton et al. | 250/83.3 H |
| 3,676,677 | 7/1972 | Condos | 250/83.3 H |
| 2,995,660 | 8/1961 | Lempicki | 250/83.3 H |

Primary Examiner—Harold A. Dixon
Attorney—R. S. Sciascia, Arthur L. Branning et al.

[57] ABSTRACT

This disclosure is directed to the use of a thermographic phosphor for the power level detection of a laser as well as displaying an image of the laser beam.

2 Claims, 1 Drawing Figure

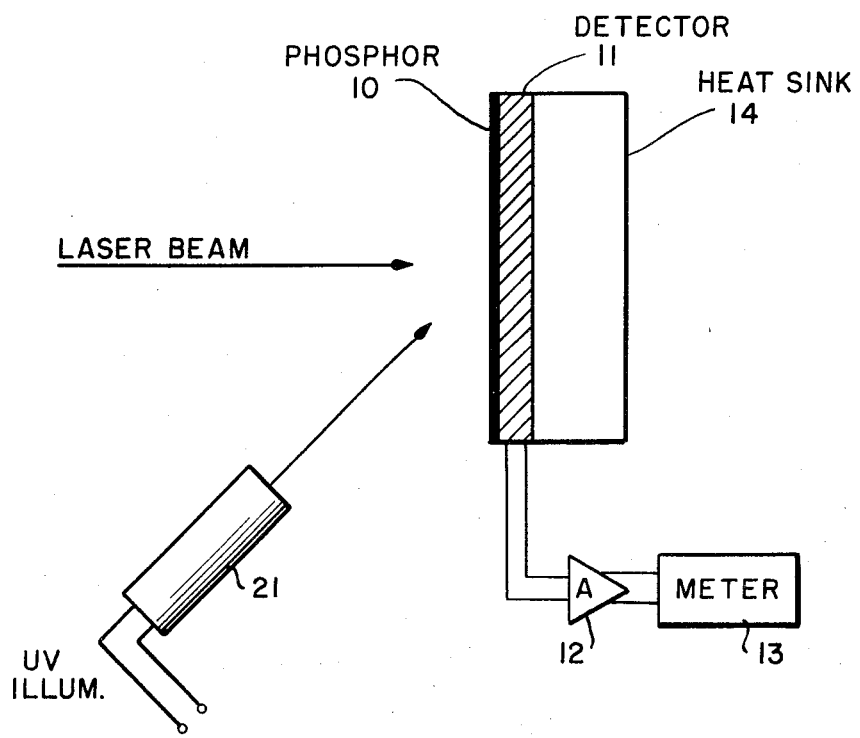

LASER IMAGE AND POWER LEVEL DETECTOR HAVING THERMOGRAPHIC PHOSPHOR

BACKGROUND OF THE INVENTION

This invention is directed to a laser image and power level detector and more particularly to a sensitive broadband detector to measure laser beam power levels while providing a visual image of the beam.

Heretofore, various devices have been used to determine the output of a laser such as burning holes in paper or wood of different thickness while observing the time elapsed for the burning. Other methods have been to use firebricks. More recent measuring techniques include thermal imaging plates using thermal sensitive phosphor, liquid crystal displays and optical power meters. The use of firebricks and burning of paper is obviously a rough estimate of power output and mostly indicates that there is an output of some degree of power. Thermal imaging plates produce specular reflection, the sensitive surfaces are easily damaged and they loose their sensitivity with age. Liquid crystal detectors have a limited temperature range, surfaces are damaged or destroyed during handling, and their sensitivity decreases with age. Power meters are not sufficiently sensitive, response and delay times are a problem and specific units must be used because of differences in spectral and dynamic ranges.

SUMMARY OF THE INVENTION

This invention makes use of a phosphor upon which laser radiation is incident in combination with a photodetector which detects light produced by the phosphor due to incidence of the laser radiation. The photodetector produces a current flow which is indicated by a suitable meter or indicator which is calibrated to provide the desired power reading. A heat sink is provided for the purpose of cooling the phosphor and photodetector.

STATEMENT OF THE OBJECTS

It is therefore an object of the invention to provide a device which is capable of simultaneously imaging and measuring the power output of a laser beam.

Another object is to provide a device which is operative over a wide spectral bandwidth.

Yet another object is to provide a device with which different phosphors and different types of photodetectors may be used.

Still another object is to provide a laser radiation imaging and power measurement device which is adaptable for different configured heat sinks.

While another object is to provide a device which has long life, is relatively inexpensive and is operable by unskilled as well as skilled personnel.

Other objects and advantages of the invention will become obvious from the following specification when considered with the drawing.

BRIEF DESCRIPTION OF THE DRAWING

The drawing is a diagrammatic view of the device.

DESCRIPTION OF THE DEVICE

Now referring to the drawing there is shown by way of example a diagrammatic view of the device made in accordance with the teaching of this invention. As shown, the device includes a thermographic phosphor window 10 made from a ZnCdS:AgNi such as disclosed in U.S. Pat. Nos. 2,551,650 and 2,642,538. The phosphor window is positioned adjacent a suitable photo detector 11 such as silicon or cadmium sulfide which produces an electrical current output in accordance with the amount of light incident on the photo-detector. The electrical current is directed through appropriate electrical lines, through a suitable amplifier 12, to a meter 13 or any other suitable indicator. The meter can be calibrated to indicate power output of the laser in terms of the electrical current output produced by the detector. In order to prevent damage due to heat of the incident laser radiation, a heat sink 14 is provided to which the detector and thermographic phosphor is secured. The heat sink is in the form of a housing through which a coolant is directed to absorb the heat developed on the phosphor and detector. Cooling systems are well known in the laser art and is not shown in detail.

As shown by illustration, the detector is secured to one surface of the heat sink and the thermographic phosphor is secured to the detector. Thus, laser radiation incident on the thermographic phosphor excites the atoms of the phosphor to produce fluorescence within the phosphor. For detection of radiation, an image of the laser beam will be visible to an observer and the fluoroscent light produced within the phosphor will be incident on the detector. The light incident on the detector will cause a current to flow which will be amplified and directed to the indicating meter. The indicating meter is calibrated in watts in order to present an output power value for the laser radiation incident on the phosphor.

It has been determined that the radiation range detectable is from about 0.001 watts to 10 watts by using different phosphors upon which the radiation is incident. Also, the laser spectral range is below 3,000 Angstroms to about 10 microns.

The detector made in accordance with the teaching of this invention may be used for detecting power outputs of lasers which operate in the visible or invisible range. When operating for detection in the visible range, there is no requirement for any additional or associated equipment than that previously described. However, when operating for detection in the invisible range, the phosphor must be illuminated by an ultraviolet light to excite fluorescence. Therefore, an ultraviolet light source 21 is provided, such as shown in the drawing. It is to be understood that the ultraviolet source is not used except for detection of radiation output in the invisible range.

In operation, for detection of invisible radiation such as a laser output in the infrared, an ultraviolet light is directed onto the phosphor in order to excite fluorescence. The invisible laser beam is directed onto the phosphor which upon striking the phosphor raises the surface temperature of the phosphor thereby producing a corresponding thermal image which is darker than the surrounding area. The thermal image may be visibily seen to observe the pattern of the laser beam. Simultaneous with observing the beam pattern, the photodetector will measure an absence of light due to the darkened area caused by the laser light. Since the detector sees less light, the detector output will be less than that prior to incidence of the laser radiation. Therefore, the power output of the laser will be determined by a difference in the before and after reading on the indicating meter. The greater the output power of the laser radiation the darker the image will be on the phosphor. Therefore, the laser outputs of invisible light may be determined by the same detector as for visible radiation by use of an ultraviolet light and by a difference between the before and after reading on the indicating meter. Different sensitivity ranges may be obtained by using different phosphor and sink for dissipating the heat produced by the laser radiation.

One of the differences in the operation of the detector for detecting visible radiation rather than invisible is, for visible radiation, the photodetector detects fluorescent light produced as a result of the incident laser radiation. For invisible laser radiation, the photo detector detects the decrease in light output by the fluorescent phosphor due to darkening of the phosphor due to incident laser radiation.

In applying the teaching of the present invention, laser radiation power may be measured by use of different phosphors, different photodetectors, different heat sinks as well as different indicator meters. Such detectors will have a wide spectral bandwidth and the detector units are relatively inexpensive and have long life.

Obviously many modifications and variations of the present invention are possible in the light of the above teachings. It is therefore to be understood that within the scope of the appended claims the invention may be practiced otherwise than as specifically described.

What is claimed and desired to be secured by Letters Patent of the United States is:

1. A detector system for measuring and imaging the power output of a laser beam; which comprises,
   a thermographic phosphor capable of fluorescence excitation by an incident laser beam,
   a solid state photodetector secured to said phosphor in optical alignment to receive fluorescence excitation produced by said phosphor due to an incident laser beam and to produce an electrical output in accordance with said fluoreescence excitation received,
   an indicator meter electrically connected with said photodetector for measuring the electrical output produced by said photodetector,
   said meter being calibrated in watts corresponding with the power of the laser beam incident on said thermo-graphic phosphor, and
   a heat sink secured to said solid state photodetector for dissipating heat produced by said laser beam incident on said phosphor,
   said heat sink including a housing with a coolant therein.

2. A detector system as claimed in claim 1; which includes,
   an amplifier for amplifying the output of said photodetectors directed to said indicating meter.

* * * * *